(12) United States Patent
An (10) Patent No.: US 12,502,340 B2
(45) Date of Patent: Dec. 23, 2025

(54) WATER-IN-OIL-IN-WATER TYPE EMULSION COSMETIC COMPOSITION AND METHOD FOR MANUFACTURING THEREOF

(71) Applicant: KOLMAR KOREA CO., LTD., Sejong-si (KR)

(72) Inventor: Jae Woo An, Seoul (KR)

(73) Assignee: KOLMAR KOREA CO., LTD., Sejong-si (KR)

( * ) Notice: Subject to any disclaimer, the term of this patent is extended or adjusted under 35 U.S.C. 154(b) by 742 days.

(21) Appl. No.: 17/810,204

(22) Filed: Jun. 30, 2022

(65) Prior Publication Data
US 2023/0165764 A1   Jun. 1, 2023

(30) Foreign Application Priority Data
Dec. 1, 2021 (KR) .................. 10-2021-0170050

(51) Int. Cl.
*A61K 8/06* (2006.01)
*A61K 8/81* (2006.01)
*A61K 8/92* (2006.01)

(52) U.S. Cl.
CPC ............ *A61K 8/066* (2013.01); *A61K 8/8129* (2013.01); *A61K 8/92* (2013.01); *A61K 2800/48* (2013.01)

(58) Field of Classification Search
CPC ........ A61K 8/066; A61K 8/8129; A61K 8/92; A61K 2800/48
See application file for complete search history.

(56) References Cited

U.S. PATENT DOCUMENTS 5,798,108 A    8/1998   L'Oreal

FOREIGN PATENT DOCUMENTS

| CN | 102665650 A | 9/2012 | |
|----|----|----|----|
| CN | 104135999 A | 11/2014 | |
| EP | 2821057 A1 | 1/2015 | |
| JP | H07509177 A | 10/1995 | |
| JP | 2018510181 A | 4/2018 | |
| KR | 2018-0038641 A | 4/2018 | |
| KR | 10-2019-0026433 A | 3/2019 | |
| KR | 10-2080459 B1 | 2/2020 | |
| KR | 102321537 B1 | 11/2021 | |
| WO | 2013/129482 A1 | 9/2013 | |
| WO | WO-2021054773 A1 * | 3/2021 | ............ A61K 8/066 |

OTHER PUBLICATIONS

WO2021054773A1 Tables 2 and 3 translation (Year: 2021).*
Office Action for European Patent Application No. 22 182 435.2 mailed Feb. 4, 2025, 6 pages.

(Continued)

*Primary Examiner* — Jiangtian Xu
(74) *Attorney, Agent, or Firm* — Kilpatrick Townsend & Stockton LLP (57) ABSTRACT

Provided is a water-in-oil-in-water (W/O/W) emulsion cosmetic composition prepared by mixing an oil-in-water emulsion and a water-in-oil emulsion, wherein the W/O/W emulsion cosmetic composition has excellent feel of use and moisturizing feel while having excellent emulsion stability even under various temperature conditions, and has an excellent absorption rate of an active ingredient on the skin.

19 Claims, 3 Drawing Sheets

(56) References Cited

OTHER PUBLICATIONS

Extended European Search Report for European Patent Application No. 22 182 435.2 mailed Dec. 23, 2022, 7 pages.
Office Action for Chinese Patent Application No. 010-81993888 mailed Nov. 11, 2024, 7 pages.
Office Action for Chinese Patent Application No. 010-81993888 mailed Apr. 2, 2025, 9 pages.

* cited by examiner

WATER-IN-OIL-IN-WATER TYPE EMULSION COSMETIC COMPOSITION AND METHOD FOR MANUFACTURING THEREOF

CROSS-REFERENCE TO RELATED APPLICATIONS

This application claims the benefit of Korean Patent Application No. 10-2021-0170050, filed on Dec. 1, 2021 in the Korean Intellectual Property Office, the disclosure of which is incorporated herein in its entirety by reference.

TECHNICAL FIELD

The present disclosure relates to a water-in-oil-in-water (W/O/W) emulsion cosmetic composition.

BACKGROUND ART

As a general emulsion cosmetic composition, an oil-in-water (O/W) emulsion cosmetic composition or a water-in-oil (W/O) emulsion cosmetic composition is mainly being used.

In the case of the O/W emulsion cosmetic composition, an external phase thereof is water so that light and refreshing feel of use can be provided beneficially, and thus utilization of the O/W emulsion cosmetic composition is high. However, there are disadvantages of being easily rubbed off with sweat or water. On the other hand, in the case of the W/O emulsion cosmetic composition, an external phase thereof is oil so that an excellent moisturizing effect can be provided. Also, compared to the O/W emulsion cosmetic composition, the W/O emulsion cosmetic composition is strong against sweat and water. However, there are disadvantages of having heavy feel of use and greasy feel.

Accordingly, in recent years, use of a water-in-oil-in-water (W/O/W) emulsion cosmetic composition having the advantages of both the O/W emulsion cosmetic composition and the W/O emulsion cosmetic composition has been increasing. In particular, the W/O/W emulsion cosmetic composition has advantages of an excellent moisturizing effect while having light and refreshing feel of use, and can stably include various active ingredients. Thus, utilization of the W/O/W emulsion cosmetic composition is high. For example, Korean Patent Registration No. 10-2018-0038641 discloses a retinol-containing W/O/W emulsion.

Meanwhile, in the case of such a multi-emulsion type, it is more difficult to form an emulsion formulation itself than to form an O/W emulsion or a W/O emulsion. Even if a W/O/W emulsion-type is prepared, emulsion stability decreased over time or with temperature changes.

Accordingly, as a W/O/W emulsion-type cosmetic composition, there is a demand for developing a cosmetic composition that can maintain a stable emulsion state as being prepared in the form of a W/O/W emulsion and that has improved feel of use and moisturizing feel at the same time that are advantages of the O/W emulsion and the W/O emulsion, respectively.

PRIOR ART DOCUMENT

Patent Document (Patent Document 1) Korean Patent Registration No. 10-2018-0038641

DESCRIPTION OF EMBODIMENTS

Technical Problem

The first object of the present disclosure is to provide a water-in-oil-in-water (W/O/W) emulsion cosmetic composition including an oil-in-water emulsion and a water-in-oil emulsion, and more particularly, to provide a W/O/W cosmetic composition that has excellent feel of use and moisturizing feel while having excellent emulsion stability under various temperature conditions, and an improved absorption rate of an active ingredient on the skin.

The second object of the present disclosure is to provide a method of preparing a W/O/W cosmetic composition by preparing each of an oil-in-water emulsion and a water-in-oil emulsion and by mixing the two emulsions, and more particularly, to provide a method of preparing a W/O/W cosmetic composition that has excellent feel of use and moisturizing feel and an excellent absorption rate of an active ingredient on the skin while having excellent emulsion stability under various temperature conditions.

The objects of the present disclosure are not limited to the aforementioned technical problems, and other technical problems can be derived from the following description.

Solution to Problem

In order to achieve the first object, the present disclosure provides a water-in-oil-in-water (W/O/W) emulsion cosmetic composition including an oil-in-water emulsion and a water-in-oil emulsion, wherein the water-in-oil emulsion includes: a W/O oil phase including a W/O emulsifier and wax; and a W/O water phase, and the oil-in-water emulsion includes: an O/W oil phase including an O/W emulsifier including one or more selected from the group consisting of a fatty acid ester-based emulsifier, a fatty acid, and fatty alcohol, wax, and oil; and an O/W water phase including a thickener and a polyol.

The W/O/W emulsion cosmetic composition may be formed by emulsifying an oil-in-water emulsion and a water-in-oil emulsion.

The water-in-oil emulsion may include the W/O emulsifier and the wax at a weight ratio in a range of about 1:0.3 to about 1:9.

The oil-in-water emulsion may include the thickener and the fatty acid ester-based emulsifier at a weight ratio in a range of about 1:5 to about 1:29.

The oil-in-water emulsion may include the oil and the O/W emulsifier at a weight ratio in a range of about 1:0.4 to about 1:2.5.

The W/O/W emulsion cosmetic composition may include, based on 100 parts by weight of the water-in-oil emulsion, the oil-in-water emulsion in an amount in a range of about 300 parts by weight to about 2,400 parts by weight.

The water-in-oil emulsion may include, based on the total weight of the water-in-oil emulsion, the W/O emulsifier in an amount in a range of about 0.01 wt % to about 10 wt % and the wax in an amount in a range of about 0.01 wt % to about 10 wt %.

The oil-in-water emulsion may include, based on the total weight of the oil-in-water emulsion, the O/W emulsifier in an amount in a range of about 0.1 wt % to about 28 wt %, the wax in an amount in a range of about 0.5 wt % to about 5 wt %, the oil in an amount in a range of about 0.5 wt % to about 40 wt %, the thickener in an amount in a range of about 0.1 wt % to about 3 wt %, and the polyol in an amount in a range of about 20 wt % to about 40 wt %.

The W/O/W emulsion cosmetic composition may further include an active ingredient, and the active ingredient may be included in the O/W water phase.

In order to achieve the second object, the present disclosure provides a method of preparing a W/O/W emulsion cosmetic composition, the method including: preparing a water-in-oil emulsion including: a W/O oil phase including a W/O emulsifier and wax; and a W/O water phase; preparing an oil-in-water emulsion including: an O/W oil phase including an O/W emulsifier including one or more selected from the group consisting of a fatty acid ester-based emulsifier, a fatty acid, and fatty alcohol, wax, and oil; and an O/W water phase including a thickener and a polyol; and adding and stirring the water-in-oil emulsion in the oil-in-water emulsion to prepare a W/O/W emulsion cosmetic composition.

Advantageous Effects of Disclosure

A water-in-oil-in-water (W/O/W) emulsion cosmetic composition of the present disclosure is formed by mixing an oil-in-water emulsion and a water-in-oil emulsion, and may implement excellent emulsion stability even under various temperature conditions and have excellent feel of use and moisturizing feel. In particular, the W/O/W emulsion cosmetic composition of the present disclosure is formed with an appropriate level of hardness, thereby implementing more excellent emulsion stability and better feel of use, and moisturizing feel. Furthermore, the W/O/W emulsion cosmetic composition of the present disclosure may include an active ingredient in the outermost water phase, and accordingly may have an improved percutaneous absorption rate.

In addition, according to a method of preparing a W/O/W emulsion cosmetic composition of the present disclosure, a W/O/W emulsion cosmetic composition is prepared by preparing each of an oil-in-water emulsion and a water-in-oil emulsion and mixing the two emulsions. Accordingly, the W/O/W emulsion cosmetic composition that is formed with an appropriate level of hardness, exhibits excellent emulsion stability under various temperature conditions, has excellent feel of use and moisturizing feel, and an improved absorption rate of an active ingredient on the skin may be provided.

BEST MODE

Hereinafter, embodiments of the present disclosure will be described in detail with reference to the accompanying drawings so that those of ordinary skill in the art can easily implement the present disclosure. However, the present disclosure may be implemented in several different forms, and may not be limited to the embodiments described herein. Also, in order to clearly describe the present disclosure in the drawings, parts irrelevant to the description may be omitted.

Terms or words used in the specification and claims of the present disclosure are not to be construed as limited in the ordinary or dictionary meanings thereof, and based on the principle that inventors of the present disclosure can appropriately define the concept of the terms to best describe the present disclosure, the terms or words should be interpreted as meaning and concept consistent with the technical idea of the present disclosure.

Throughout the specification of the present disclosure, when a portion "includes" a component, it means that other components may be further included, rather than excluding other components, unless otherwise stated.

Throughout the specification of the present disclosure, the expression "A and/or B" refers to A or B, or both A and B.

The present disclosure is described in detail below, but is not limited thereto.

The present disclosure provides a water-in-oil-in-water (W/O/W) emulsion cosmetic composition.

An aspect of the present disclosure provides, as a water-in-oil-in-water (W/O/W) emulsion cosmetic composition formed by emulsifying an oil-in-water emulsion and a water-in-oil emulsion, the W/O/W emulsion cosmetic composition formed by mixing and emulsifying a water-in-oil emulsion and an oil-in-water emulsion, wherein the water-in-oil emulsion includes: a W/O oil phase including a W/O emulsifier and wax; and a W/O water phase, and the oil-in-water emulsion includes: an O/W oil phase including an O/W emulsifier including one or more selected from the group consisting of a fatty acid ester-based emulsifier, a fatty acid, and fatty alcohol, wax, and oil; and an O/W water phase including a thickener and a polyol.

In an embodiment, by mixing and emulsifying each of the stabilized oil-in-water emulsion and the stabilized water-in-oil emulsion, the W/O/W emulsion cosmetic composition in a stable state may be formed by using a further simpler method. Particularly, in the related art, a W/O/W emulsion cosmetic composition was prepared by mixing a water-in-oil emulsion with a water-based ingredient. However, according to an embodiment of the present disclosure, the W/O/W emulsion cosmetic composition may be easily prepared and the stability thereof may be further improved.

The W/O/W emulsion cosmetic composition according to an embodiment of the present disclosure may implement excellent emulsion stability under temperature conditions including low temperature, room temperature, high temperature, temperature cycles, thereby stably maintaining the W/O/W emulsion state even under various temperature-changing conditions. In addition, the W/O/W emulsion cosmetic composition according to an embodiment of the present disclosure may have excellent feel of use and moisturizing feel. In particular, as the W/O/W emulsion cosmetic composition according to an embodiment of the present disclosure is formed with an appropriate level of hardness, more excellent emulsion stability and better feel of use and moisturizing feel may be implemented.

Furthermore, as the W/O/W emulsion cosmetic composition according to an embodiment of the present disclosure includes an active ingredient in the outermost water phase, an improved percutaneous absorption rate may be implemented, thereby implementing an excellent skin improvement effect. Here, the outermost water phase may refer to the O/W water phase.

The active ingredient is not particularly limited as long as it is a component capable of implementing a skin improvement effect. For example, the active ingredient may include niacinamide, a *Broussonetia* extract, arbutin, ethyl ascorbyl ether, ascorbyl glucoside, magnesium ascorbyl phosphate, and ascorbyl tetraisopalmitate, but is not limited thereto. For use as the active ingredient, any component having a skin improvement effect known in the art may be used.

Hereinafter, the water-in-oil components constituting the W/O/W emulsion cosmetic composition according to an embodiment of the present disclosure will be described in detail.

(1) Water-In-Oil Emulsion: W/O Emulsifier

In an embodiment, the water-in-oil emulsion may include a W/O emulsifier, and any W/O emulsifier component known in the art may be used. For example, the W/O emulsifier may include one or more selected from the group consisting of cetyl PEG/PPG-10/1 dimethicone, sorbitan sesquioleate, polyglyceryl-4 diisostearate/polyhydroxystearate/sebacate, lauryl polyglyceryl-3 polydimethylsiloxyethyl dimethicone, but is not limited thereto.

In an embodiment, the water-in-oil emulsion may include, based on the total weight of the water-in-oil emulsion, a W/O emulsifier in an amount in a range of about 0.01 wt % to about 10 wt %, for example, in a range of about 0.04 wt % to about 7 wt %, and for example, in a range of about 1 wt % to about 7 wt %. In particular, when the water-in-oil emulsion according to an embodiment includes the W/O emulsifier in the amount in a range of about 1 wt % to about 7 wt % based on the total weight of the water-in-oil emulsion, the W/O/W emulsion cosmetic composition according to an embodiment may have further improved properties in terms of emulsion stability, feel of use, moisturizing feel, and an absorption rate on the skin.

For example, when the water-in-oil emulsion according to an embodiment includes the W/O emulsifier in the amount of less than about 0.01 wt % based on the total weight of the water-in-oil emulsion, the emulsification itself is not appropriately performed, and thus the formation of the water-in-oil emulsion may be difficult. On the other hand, when the water-in-oil emulsion according to an embodiment includes the W/O emulsifier in the amount of greater than about 10 wt % based on the total weight of the water-in-oil emulsion, compared to a case where the W/O emulsifier is included in the amount in a range of about 0.01 wt % to about 10 wt %, the emulsion stability, the feel of use, the moisturizing feel, and the absorption rate on the skim may be degraded.

(2) Water-In-Oil Emulsion: Wax

In an embodiment, the water-in-oil emulsion may include wax, and any wax component known in the art may be used. For example, the wax may include one or more selected from the group consisting of glyceryl behenate/eicosadioate, beeswax, Jojoba seed wax, microcrystalline wax, shea butter, ceresin wax, paraffin wax, polyethylene wax, ozokerite, petrolatum and candelilla wax. In detail, the wax may include one or more selected from the group consisting of beeswax wax and candelilla wax, but is not limited thereto.

In an embodiment, the water-in-oil emulsion may include, based on the total weight of the water-in-oil emulsion, the wax in an amount in a range of about 0.01 wt % to about 10 wt %, for example, in a range of about 1 wt % to about 9 wt %, and for example, in a range of about 3 wt % to about 8.5 wt %. In particular, when the water-in-oil emulsion according to an embodiment includes the wax in the amount in a range of about 3 wt % to about 8.5 wt % based on the total weight of the water-in-oil emulsion, the W/O/W emulsion cosmetic composition according to an embodiment may have further improved properties in terms of emulsion stability, feel of use, moisturizing feel, and an absorption rate on the skin.

For example, when the water-in-oil emulsion according to an embodiment includes the wax in the amount of less than about 0.01 wt % based on the total weight of the water-in-oil emulsion, the hardness is not formed at an appropriate level, and accordingly a difference in density of the water-in-oil emulsion and density of the oil-in-water emulsion increases, thereby causing a problem of separation of layers in a finally produced formulation. On the other hand, when the water-in-oil emulsion according to an embodiment includes the wax in the amount of greater than about 10 wt % based on the total weight of the water-in-oil emulsion, compared to a case where the wax is included in the amount in a range of about 0.01 wt % to about 10 wt %, the emulsion stability, the feel of use, the moisturizing feel, and the absorption rate on the skin may be degraded.

In an embodiment, the water-in-oil emulsion may include the W/O emulsifier and the wax, and these two components may be included at a weight ratio in a range of about 1:0.3 to about 1:9. In this regard, improved emulsion stability and better feel of use and moisturizing feel may be implemented.

In one or more embodiments, the water-in-oil emulsion may include the W/O emulsifier and the wax, and these two components may be included at a weight ratio in a range of about 1:0.5 to about 1:7. In this regard, significantly improved emulsion stability and much better feel of use and moisturizing feel may be implemented.

In addition, the water-in-oil emulsion may further include, in addition to the W/O emulsifier, the wax, and the remaining amount of water, a known excipient or a known additive.

For example, the excipient or the additive may include one or more selected from the group consisting of a surfactant, an emulsifier, an emulsifying auxiliary agent, a silicone polymer, a pigment, a colorant, a fragrance, a preservative, a bactericide, an oxidation stabilizer, an organic solvent, a softening agent, an oxidation inhibitor, a free radical scavenger, an opacifying agent, a stabilizer, an emollient, a defoamer, a moisturizing agent, a vitamin, an insect repellent agent, a preservative, an anti-inflammatory agent, a filler, a polymer, a propellant, a basifying agent, an acidifying agent, a coloring agent, a thickener, a skin conditioning agent, a whitening agent, an antioxidant, a wrinkle improvement agent, and a solubilizer, but is not limited thereto.

In addition, hereinafter, the oil-in-water emulsion components constituting the W/O/W emulsion cosmetic composition according to an embodiment will be described in detail.

(3) Oil-In-Water Emulsion: O/W Emulsifier

In an embodiment, the oil-in-water emulsion may include an O/W emulsifier including one or more selected from the group consisting of a fatty acid ester-based emulsifier, a fatty acid, and fatty alcohol.

In one or more embodiments, the oil-in-water emulsion may include an O/W emulsifier including a fatty acid ester-based emulsifier, a fatty acid, and fatty alcohol, and when the oil-in-water emulsion includes all of the fatty acid ester-based emulsifier, the fatty acid, and the fatty alcohol, the W/O/W emulsion cosmetic composition according to an embodiment may have further improved properties in terms of emulsion stability, feel of use, moisturizing feel, and an absorption rate on the skin.

For use as the fatty acid ester-based emulsifier, any fatty acid ester-based component known in the art may be used. For example, the fatty acid ester-based emulsifier may include one or more selected from the group consisting of PEG-100 stearate, PEG-40 stearate, glyceryl stearate, steareth-2, steareth-6, steareth-10, and steareth-21, but is not limited thereto.

For use as the fatty acid, any fatty acid component known in the art may be used. For example, the fatty acid may include one or more selected from the group consisting of palmitic acid, myristic acid, and stearic acid, but is not limited thereto.

For use as the fatty alcohol, any fatty alcoholic component known in the art may be used. For example, the fatty alcohol may include one or more selected from the group consisting of cetyl alcohol, behenyl alcohol, stearyl alcohol, and oleyl alcohol, but is not limited thereto.

In an embodiment, the oil-in-water emulsion may include, based on the total weight of the oil-in-water emulsion, the O/W emulsifier in an amount in a range of about 0.1 wt % to about 28 wt %, for example, in a range of about 1 wt % to about 25 wt %, and for example, in a range of about 5 wt % to about 23 wt %. In particular, when the oil-in-water emulsion according to an embodiment includes the O/W emulsifier in the amount in a range of about 5 wt % to about 23 wt % based on the total weight of the oil-in-water emulsion, the W/O/W emulsion cosmetic composition according to an embodiment may have further improved properties in terms of emulsion stability, feel of use, moisturizing feel, and an absorption rate on the skin.

For example, when the oil-in-water emulsion according to an embodiment includes the O/W emulsifier in the amount of less than about 0.1 wt % based on the total weight of the oil-in-water emulsion, the emulsification itself is not appropriately performed, and thus the formation of the water-in-oil emulsion may be difficult. On the other hand, when the oil-in-water emulsion according to an embodiment includes the O/W emulsifier in the amount of greater than about 28 wt % based on the total weight of the oil-in-water emulsion, compared to a case where the O/W emulsifier is included in the amount in a range of about 0.1 wt % to about 28 wt %, the emulsion stability, the feel of use, the moisturizing feel, and the absorption rate on the skim may be degraded.

(4) Oil-In-Water Emulsion: Wax

In an embodiment, the oil-in-water emulsion may include wax, and any wax component known in the art may be used. For example, the wax may include one or more selected from the group consisting of glyceryl behenate/eicosadioate, bees wax, Jojoba seed wax, microcrystalline wax, shea butter, ceresin wax, paraffin wax, polyethylene wax, ozokerite, petrolatum and candelilla wax. In detail, the wax may include one or more selected from the group consisting of beeswax wax and candelilla wax, but is not limited thereto.

In an embodiment, the oil-in-water emulsion may include, based on the total weight of the oil-in-water emulsion, the wax in an amount in a range of about 0.5 wt % to about 5 wt %, for example, in a range of about 1 wt % to about 4 wt %, and for example, in a range of about 1.5 wt % to about 3 wt %. In particular, when the oil-in-water emulsion according to an embodiment includes the wax in the amount in a range of about 1.5 wt % to about 3 wt % based on the total weight of the oil-in-water emulsion, the W/O/W emulsion cosmetic composition according to an embodiment may have further improved properties in terms of emulsion stability, feel of use, moisturizing feel, and an absorption rate on the skin.

When the oil-in-water emulsion according to an embodiment includes the wax in the amount of less than about 0.5 wt % based on the total weight of the oil-in-water emulsion, the hardness is not formed at an appropriate level, and accordingly a difference in density of the water-in-oil emulsion and density of the oil-in-water emulsion increases, thereby causing a problem of separation of layers in a finally produced formulation. On the other hand, when the oil-in-water emulsion according to an embodiment includes the wax in the amount of greater than about 5 wt % based on the total weight of the oil-in-water emulsion, compared to a case where the wax is included in the amount in a range of about 0.5 wt % to about 5 wt %, the emulsion stability, the feel of use, the moisturizing feel, and the absorption rate on the skin may be degraded.

(5) Oil-In-Water Emulsion: Oil

In an embodiment, the oil-in-water emulsion may include oil, and any oil component known in the art may be used. In an embodiment, the oil may include one or more selected from the group consisting of vegetable oil, synthetic oil, and silicone oil.

For example, the vegetable oil may include one or more selected from the group consisting of canola oil, castor oil, corn oil, cottonseed oil, evening primrose oil, palm kernel oil, chloridized maleate soybean phospholipid oil, rosehip soybean oil, green tea seed oil, macadamia seed oil, citron seed extract, and squalane.

The synthetic oil may include one or more selected from the group consisting of ester oil, siloxane, dibutyl adipate, $C_{15}$-$C_{19}$ alkane, hydrogenated polydecene, hydrogenated polyisobutene, $C_{15}$-$C_{19}$ alkane, hexyldecanol/hexyldecyllaurate, cetearyl octanoate, isocetyl stearate, dicaprylyl ether, dicaprylyl carbonate, isononylisononanoate, dipentaerythrityltri-polyhydroxystearate, and pentaerythrityltetraethylhexanoate.

The silicone oil may include one or more selected from the group consisting of dimethicone, caprylyl methicone, ethyl methicone, phenylpro ethyl methicone, phenyl trimethicone, and decamethylcyclopentasiloxane.

In an embodiment, the oil-in-water emulsion may include, based on the total weight of the oil-in-water emulsion, the oil in an amount in a range of about 0.5 wt % to about 40 wt %, for example, in a range of about 1 wt % to about 30 wt %, and for example, in a range of about 10 wt % to about 30 wt %. In particular, when the oil-in-water emulsion according to an embodiment includes the oil in the amount in a range of about 10 wt % to about 30 wt % based on the total weight of the oil-in-water emulsion, the emulsion stability, the feel of use, the W/O/W emulsion cosmetic composition according to an embodiment may have further improved properties in terms of emulsion stability, feel of use, moisturizing feel, and an absorption rate on the skin.

For example, when the oil-in-water emulsion according to an embodiment includes the oil in the amount of less than about 0.5 wt % based on the total weight of the oil-in-water emulsion, the oil-in-water emulsion is not performed properly, and thus formation of the W/O/W emulsion may be difficult. On the other hand, when the oil-in-water emulsion according to an embodiment includes the oil in the amount of greater than 40 wt % based on the total weight of the oil-in-water emulsion, the emulsification itself is not appropriately performed, and thus the formation of the oil-in-water emulsion may be difficult.

In an embodiment, the oil-in-water emulsion may include the oil and the O/W emulsifier, and these two components may be included at a weight ratio in a range of about 1:0.4 to about 1:2.5. In this case, the W/O/W emulsion cosmetic composition according to an embodiment may be formed with an appropriate level of hardness and may implement excellent emulsion stability and good feel of use and moisturizing feel.

In one or more embodiments, the oil-in-water emulsion may include the oil and the O/W emulsifier at a weight ratio in a range of about 1:0.5 to about 1:1.5. In this case, the W/O/W emulsion cosmetic composition according to an embodiment may be formed with an appropriate level of hardness and may implement significantly excellent emulsion stability and much better feel of use and moisturizing feel.

(6) Oil-In-Water Emulsion: Thickener

In an embodiment, the oil-in-water emulsion may include a thickener, and the thickener may include a polyacrylate-based thickener.

In an embodiment, the polyacrylate-based thickener may include polyacrylate-13. In particular, as polyacrylate-13 is included as the polyacrylate-based thickener, the W/O/W emulsion cosmetic composition according to an embodiment may have further improved properties in terms of emulsion stability, feel of use, and moisturizing feel.

In an embodiment, the oil-in-water emulsion may include, based on the total weight of the oil-in-water emulsion, the thickener in an amount in a range of about 0.1 wt % to about 3 wt %, for example, in a range of about 0.4 wt % to about 2 wt %, and for example, in a range of about 0.5 wt % to about 1 wt %. In particular, when the oil-in-water emulsion according to an embodiment includes the thickener in the amount in a range of about 0.5 wt % to about 1 wt % based on the total weight of the oil-in-water emulsion, the W/O/W emulsion cosmetic composition according to an embodiment may have further improved properties in terms of emulsion stability, feel of use, moisturizing feel, and an absorption rate on the skin.

For example, when the oil-in-water emulsion according to an embodiment includes the thickener in the amount of less than about 0.1 wt % based on the total weight of the oil-in-water emulsion, compared to a case where the thickener is included in the amount in a range of about 0.1 wt % to about 3 wt %, the emulsion stability, the feel of use, the moisturizing feel, and the absorption rate on the skin may be degraded. On the other hand, when the oil-in-water emulsion according to an embodiment includes the thickener in the amount of greater than 3 wt % based on the total weight of the oil-in-water emulsion, the emulsification itself is not appropriately performed or the agglomeration occurs, and thus the formation of the oil-in-water emulsion may be difficult.

In an embodiment, the oil-in-water emulsion may include the thickener and the fatty acid ester-based emulsifier, and these two components may be included at a weight ratio in a range of about 1:5 to about 1:29. In this case, the W/O/W emulsion cosmetic composition according to an embodiment may be formed with an appropriate level of hardness and may implement excellent emulsion stability and good feel of use and moisturizing feel.

In one or more embodiments, the oil-in-water emulsion may include the thickener and the fatty acid ester-based emulsifier, and these two components may be included at a weight ratio in a range of about 1:8 to about 1:20. In this case, the W/O/W emulsion cosmetic composition of this embodiment may be formed with an appropriate level of hardness and may implement significantly excellent emulsion stability and much better feel of use and moisturizing feel.

(7) Oil-In-Water Emulsion: Polyol

In an embodiment, the oil-in-water emulsion may include a polyol, and any polyol component known in the art may be used.

For example, the polyol may include one or more selected from the group consisting of glycerin, butylene glycol, 1,3-propanediol, methpropanediol, and polyglycerin-3, but is not limited thereto.

In an embodiment, the oil-in-water emulsion may include, based on the total weight of the oil-in-water emulsion, the polyol in an amount in a range of about 20 wt % to about 40 wt %, for example, in a range of about 22 wt % to about 35 wt %, and for example, in a range of about 25 wt % to about 30 wt %. In particular, when the oil-in-water emulsion according to an embodiment includes the polyol in the amount in a range of about 25 wt % to about 30 wt % based on the total weight of the oil-in-water emulsion, the W/O/W emulsion cosmetic composition according to an embodiment may have further improved properties in terms of emulsion stability, feel of use, moisturizing feel, and an absorption rate on the skin.

For example, when the oil-in-water emulsion according to an embodiment includes the polyol in the amount of less than about 20 wt % based on the total weight of the oil-in-water emulsion, compared to a case where the polyol is included in the amount in a range of about 20 wt % to about 40 wt %, the emulsion stability, the feel of use, the moisturizing feel, and the absorption rate on the skin may be degraded. On the other hand, when the oil-in-water emulsion according to an embodiment includes the polyol in the amount of greater than 40 wt % based on the total weight of the oil-in-water emulsion, the emulsification itself is not appropriately performed or the agglomeration occurs, and thus the formation of the oil-in-water emulsion may be difficult.

In an embodiment, the oil-in-water emulsion may further include a non-ionic surfactant. In one or more embodiments, the oil-in-water emulsion may further include a non-ionic surfactant in the O/W water phase.

For example, the non-ionic surfactant may include one or more selected from the group consisting of PEG-40 hydrogenated castor oil, polyoxyethylene hydrogenated castor oil, and PEG-25 cetyl/stearyl ether, but is not limited thereto.

In an embodiment, the oil-in-water emulsion may include, based on the total weight of the oil-in-water emulsion, the non-ionic surfactant oil in an amount in a range of about 2 wt % to about 20 wt %, for example, in a range of about 3 wt % to about 10 wt %, and for example, in a range of about 4 wt % to about 8 wt %. In particular, when the oil-in-water emulsion according to an embodiment further includes the non-ionic surfactant in the amount in a range of about 4 wt % to about 8 wt % based on the total weight of the oil-in-water emulsion, the W/O/W emulsion cosmetic composition according to an embodiment may have further improved properties in terms of emulsion stability, feel of use, moisturizing feel, and an absorption rate on the skin.

In one or more embodiments, the oil-in-water emulsion may further include, in addition to the O/W emulsifier, the wax, the oil, the thickener, the polyol, and the residual amount of purified water, a known excipient or a known additive.

For example, the excipient or the additive may include one or more selected from the group consisting of a surfactant, an emulsifier, a emulsifying auxiliary agent, a silicone polymer, a pigment, a colorant, a fragrance, a preservative, a bactericide, an oxidation stabilizer, an organic solvent, a softening agent, an oxidation inhibitor, a free radical scavenger, an opacifying agent, a stabilizer, an emollient, a defoamer, a moisturizing agent, a vitamin, an insect repellent agent, a preservative, an anti-inflammatory agent, a filler, a polymer, a propellant, a basifying agent, an acidifying agent, a coloring agent, a thickener, a skin conditioning agent, a whitening agent, an antioxidant, a wrinkle improvement agent, and a solubilizer, but is not limited thereto.

In an embodiment, the W/O/W emulsion cosmetic composition may include, based on 100 parts by weight of the water-in-oil emulsion, the oil-in-water emulsion in an amount in a range of about 300 parts by weight to about 2,400 parts by weight, for example, in a range of about 300 parts by weight to about 1,900 parts by weight. In particular, when the W/O/W emulsion cosmetic composition according to an embodiment includes the oil-in-water emulsion in the amount in a range of about 300 parts by weight to about 1,900 parts by weight based on 100 parts by weight of the oil-in-water emulsion, the W/O/W emulsion cosmetic composition according to an embodiment may have further improved properties in terms of emulsion stability, feel of use, and moisturizing feel.

For example, when the W/O/W emulsion cosmetic composition according to an embodiment includes, based on 100 parts by weight of the water-in-oil emulsion, the oil-in-water emulsion in the amount of less than 300 parts by weight or in the amount of greater than 2,400 parts by weight, the formation of the W/O/W emulsion itself may be difficult. Even if the W/O/W emulsion is formed, the stability thereof according to temperatures may be degraded.

The W/O/W emulsion cosmetic composition according to an embodiment may have a hardness level in a range of about 200 to 500, for example, about 250 to about 450. In particular, when the W/O/W emulsion cosmetic composition according to an embodiment is formed with an appropriate level hardness in a range of about 200 to about 500, excellent feel of use and moisturizing feel and excellent formulation stability may be implemented.

In addition, another aspect of the present disclosure provides a method of preparing a W/O/W emulsion cosmetic composition.

According to the method of preparing the W/O/W emulsion cosmetic composition, the method includes: preparing a water-in-oil emulsion including: a W/O oil phase including a W/O emulsifier and wax; and W/O water phase; preparing an oil-in-water emulsion including: an O/W oil phase including an O/W emulsifier including one or more selected from the group consisting of a fatty acid ester-based emulsifier, a fatty acid, and fatty alcohol, wax, and oil; and an O/W water phase including a thickener and a polyol; and adding and stirring the water-in-oil emulsion in the oil-in-water emulsion to prepare a W/O/W emulsion cosmetic composition.

According to the method of preparing the W/O/W emulsion cosmetic composition of the present disclosure, the W/O/W emulsion cosmetic composition that has an appropriate level of hardness and improved feel of use and moisturizing feel while having excellent emulsion stability under various temperature conditions may be prepared.

In detail, in the preparing of the water-in-oil emulsion, the W/O oil phase including the W/O emulsifier and the wax and the W/O water phase including purified water are each heated at a temperature in a range of about 75° C. to about 85° C., and the W/O water phase is slowly added to the W/O oil phase, stirred, and cooled, thereby preparing a W/O emulsion.

In addition, in the preparing of the oil-in-water emulsion, the O/W oil phase including the O/W emulsifier, the wax, and the oil and the O/W water phase including the polyol and the residual amount of purified water are each heated at a temperature in a range of about 75° C. to about 85° C., and the O/W oil phase is slowly added to the O/W water phase, stirred, and cooled. The thickener is then added to and stirred in the mixed solution, thereby preparing an O/W emulsion.

In addition, in the preparing of the W/O/W emulsion cosmetic composition, the formed water-in-oil emulsion is slowly added to the formed oil-in-water emulsion, stirred, fooled, and defoamed, thereby preparing a W/O/W emulsion cosmetic composition.

Here, stirring may be performed in each step. For example, the stirring may be performed at a HOMO speed in a range of about 3,000 rpm to about 4,000 rpm for about 5 minutes to about 15 minutes, but is not limited thereto.

Hereinafter, the W/O/W emulsion cosmetic composition of the present disclosure and the method of preparing the same will be described in detail through Examples, Comparative Examples, and Experimental Examples below. However, these Examples are only for illustrating the present disclosure, and thus the scope of the present disclosure is not to be construed as being limited by these Examples.

EXPERIMENTAL EXAMPLES

Experimental Example 1: Evaluation of W/O Emulsion Properties According to Ratio of W/O Emulsifier to Wax (1) Preparation of W/O Emulsion A W/O oil phase and a W/O water phase disclosed in Table 1 [unit: wt %] were each heated to 80° C. Then, the W/O water phase was slowly added to the W/O oil phase, and the mixture was stirred for about 10 minutes at a HOMO speed of 3,500 rpm, and then cooled to 40° C. at a paddle speed of 25 rpm.

Here, according to Preparation Examples 1 to 5, W/O emulsions were prepared by varying a ratio of the W/O emulsifier to the wax as shown in Table 2 [unit: wt %] while maintaining the total amount of these two components the same as 9.6 wt %.

TABLE 1

| Water-in-oil emulsion | Preparation Examples 1 to 5 (wt %) |
|---|---|
| W/O emulsifier | 9.6 |
| Wax | |
| Oil | 25.0 |
| Purified water | to. 100 |

Here, the W/O emulsifier of Table 1 included cetyl PEG/PPG-10/dimethicone, the wax included beeswax, and the oil included hydrogenated polydecene.

TABLE 2

| | Preparation Example 1 | Preparation Example 2 | Preparation Example 3 | Preparation Example 4 | Preparation Example 5 |
|---|---|---|---|---|---|
| W/O emulsifier | 1 | 1 | 1 | 1 | 1 |
| Wax | 0.1 | 0.5 | 7 | 10 | 15 |

(2) Evaluation of Performance of W/O Emulsion

Regarding the W/O emulsions prepared according to Preparation Examples 1 to 5, an emulsification degree, hardness, feel of use, and moisturizing feel were evaluated, and the results are shown in Table 3.

In detail, the emulsion state was observed with the naked eye, and a case where a stable emulsion state was formed was indicated as 'stable', whereas a case where a phenomenon such as separation of layers, precipitation, aggregation, or syneresis occurred was indicated as 'unstable'. Here, the emulsion state refers to the emulsion state observed for about 1 week to 5 weeks, and the temperature cycles refer to a case where processes of maintaining a temperature of −20° C. for 6 hours, heating to 20° C. over 6 hours, maintaining the temperature of 20° C. for 6 hours, and cooling to −20° C. over 6 hours are sequentially performed.

In addition, the hardness was measured by using FUDOH RHEO METER (D TYPE) manufactured by RHEO TECH CO, LTD. In detail, the hardness was measured after the sample that was evaluated for the emulsification stability was stored at room temperature for 24 hours, The hardness was set by measuring PEAK values under conditions that a standard size for pins used for the measurement was 20 mm PI PIN, a measurement depth was DEPTH 15 mm, and a rate of movement for the measurement was 30 cm/s.

In addition, for the feel of use and the moisturizing feel, 1 mg/cm$^2$ of a sample (i.e., a W/O emulsion) was applied to test subjects consisting of 20 women in their twenties to forties. In detail, the sample was applied on the inner arm of a test subject with an area of 3 cm by 2 cm according to usual makeup habit, and then the feel of use and the moisturizing feel were evaluated on a scale of 1 to 10. Afterwards, an average value was obtained by adding up the scores of 20 people was obtained, and the values excluding the deviation are shown in Table 3. Here, a point closer to 10 points refers to excellent feel of use and excellent moisturizing feel.

TABLE 3

| | | Preparation Example 1 | Preparation Example 2 | Preparation Example 3 | Preparation Example 4 | Preparation Example 5 |
|---|---|---|---|---|---|---|
| Emulsion stability | Low temperature (4° C.) | Unstable | Stable | Stable | Stable | Unstable |
| | Room temperature (25° C.) | Unstable | Stable | Stable | Stable | Unstable |
| | High temperature (45° C.) | Unstable | Stable | Stable | Unstable | Unstable |
| | Cycles (−20° C. to 20° C.) | Unstable | Stable | Stable | Unstable | Unstable |
| Hardness | | 30 | 100 | 300 | 400 | 800 |
| Feeling of use | | 4 | 6 | 6 | 2 | 1 |
| Moisturizing feeling | | 6 | 8 | 8 | 5 | 5 |

Referring to Table 3, in the case of Preparation Examples 2 and 3 in which the W/O emulsifier and the wax from among the components consisting the water-in-oil emulsion were included at a weight ratio in a range of about 1:0.3 to about 1:9, it was confirmed that emulsion state was maintained stably in all conditions including low temperature, room temperature, high temperature, and temperature cycles and that the feel of use and the moisturizing feel were both excellent.

In addition, in the case of Preparation Examples 2 and 3, it was confirmed that the hardness was formed at an appropriate level in a range of about 100 to about 300.

However, in the case of Preparation Example 1, the emulsion state was unstable under all conditions including low temperature, room temperature, high temperature, and temperature cycles, and that the hardness was significantly low, and thus it was confirmed that the W/O emulsion was not suitable for the preparation of the W/O/W emulsion cosmetic composition.

In addition, in the case of Preparation Example 4, the separation of layers occurred, and thus it was confirmed that the stable emulsion state was not maintained under conditions including high temperature and temperature cycles and that both the feel of use and the moisturizing feel were degraded. In the case of Preparation Example 5, the syneresis occurred, and thus it was confirmed that the emulsion state was unstable under all conditions including low temperature, room temperature, high temperature, and temperature cycles and that both the feel of use and the moisturizing feel were degraded. In particular, in Preparation Examples 4 and 5, the hardness level was formed to be greater than or equal to 400, and thus the W/O emulsion itself was hard. Accordingly, it was confirmed that the W/O emulsion was not suitable for the preparation of the W/O/W emulsion cosmetic composition.

Through Experimental Example 1, it was confirmed that, when the W/O emulsifier and the wax were included at a weight ratio in a range of about 1:0.3 to about 1:9 in the W/O emulsion, the W/O emulsion having excellent emulsion stability, moisturizing feel, and feel of use and an appropriate hardness level was formed.

Accordingly, the W/O emulsion of Preparation Example 2 in which the W/O emulsifier and the wax were included at a weight ratio in a range of about 1:0.3 to about 1:9 in the W/O emulsion was used to prepare a cosmetic composition, and properties thereof were evaluated.

Experimental Example 2: Evaluation of Cosmetic Composition Properties According to Mixing Ratio of Fatty Acid Ester Emulsifier to Thickener in O/W Emulsion (1) Preparation of O/W Emulsion An oil phase and a water phase disclosed in Table 4 [unit:wt %] were each heated to 80° C. Then, the oil phase was slowly added to the water phase, and the mixture was stirred for about 5 minutes at a HOMO speed of 3,500 rpm. Subsequently, the resulting mixture was cooled to about 60° C. at a PADDLE speed of 25 rpm, and finally, a thickener was added thereto and stirred for about 5 minutes at a HOMO speed of 3,500 rpm, thereby preparing an O/W emulsion.

TABLE 4

| Phase | Component | | Preparation Example 6 |
|---|---|---|---|
| Oil phase | O/W emulsifier | Fatty acid ester-based emulsifier | 9.57 |
| | | Fatty acid | 0.54 |
| | | Fatty alcohol | 3.26 |
| | Wax | | 1.63 |
| | Oil | | 26.74 |
| Water phase | Thickener | | 0.87 |
| | Polyol | | 27.17 |
| | Purified water | | to. 100 |

Here, in Table 4, the fatty acid ester-based emulsifier included PEG-100 stearate, and the fatty acid included 0.298 wt % of palmitic acid, 0.242 wt % of myristic acid, and 0.003 wt % of stearic acid (0.54 wt % in total), and the fatty alcohol included cetyl alcohol.

In addition, in Table 4, the wax included beeswax, the oil included squalane, and the thickener included polyacrylate-13.

A cosmetic composition was prepared by changing a ratio of the fatty acid ester-based emulsifier to the thickener as shown in Table 5 [unit: weight ratio] below while maintaining the total amount of these two components as 10.44 wt %.

Here, in Table 5, the weight ratio of the fatty acid ester-based emulsifier to the thickener in the O/W emulsion of Preparation Example 6 was also listed.

TABLE 5

|  | Preparation Example 6 | Preparation Example 7 | Preparation Example 8 | Preparation Example 9 | Preparation Example 10 | Preparation Example 11 | Preparation Example 12 | Preparation Example 13 | Preparation Example 14 |
|---|---|---|---|---|---|---|---|---|---|
| Fatty acid ester-based emulsifier (O/W emulsifier) | 11 | 8 | 16 | 20 | 1 | 2 | 4 | 30 | 40 |
| Thickener | 1 | 1 | 1 | 1 | 1 | 1 | 1 | 1 | 1 |

(2) Preparation of Cosmetic Composition

Afterwards, as disclosed in Table 6, the W/O emulsion of Preparation Example 2 was slowly added to each O/W emulsion, stirred for about 10 minutes at a HOMO speed of 3,500 rpm, and then cooled at a temperature of about 40° C. at a PADDLE speed of 25 rpm for defoamation, thereby preparing a W/O/W emulsion cosmetic composition.

Here, an amount of the O/W emulsion in the mixture was 700 parts by weight based on 100 parts by weight of the O/W emulsion, thereby forming the W/O/W emulsion cosmetic composition.

TABLE 6

|  | Composition 1 | Composition 2 | Composition 3 | Composition 4 | Composition 5 |
|---|---|---|---|---|---|
| W/O emulsion | Preparation Example 2 | Preparation Example 2 | Preparation Example 2 | Preparation Example 2 | Preparation Example 2 |
| O/W emulsion | Preparation Example 6 | Preparation Example 7 | Preparation Example 8 | Preparation Example 9 | Preparation Example 10 |

|  | Composition 6 | Composition 7 | Composition 8 | Composition 9 |
|---|---|---|---|---|
| W/O emulsion | Preparation Example 2 | Preparation Example 2 | Preparation Example 2 | Preparation Example 2 |
| O/W emulsion | Preparation Example 11 | Preparation Example 12 | Preparation Example 13 | Preparation Example 14 |

(3) Evaluation of Performance of Cosmetic Composition

For the cosmetic compositions of Compositions 1 to 9, the performance evaluation test was carried out in the same manner as in Experimental Example 1, and the results are shown in Table 7.

Figure 1:
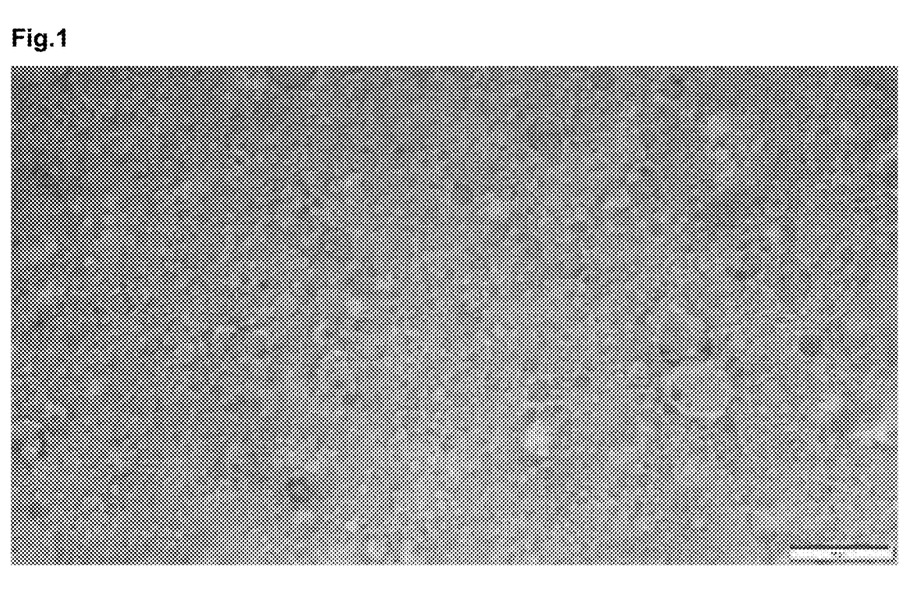
FIG. 1 is a microscopic image of Composition 3.
Figure 2:
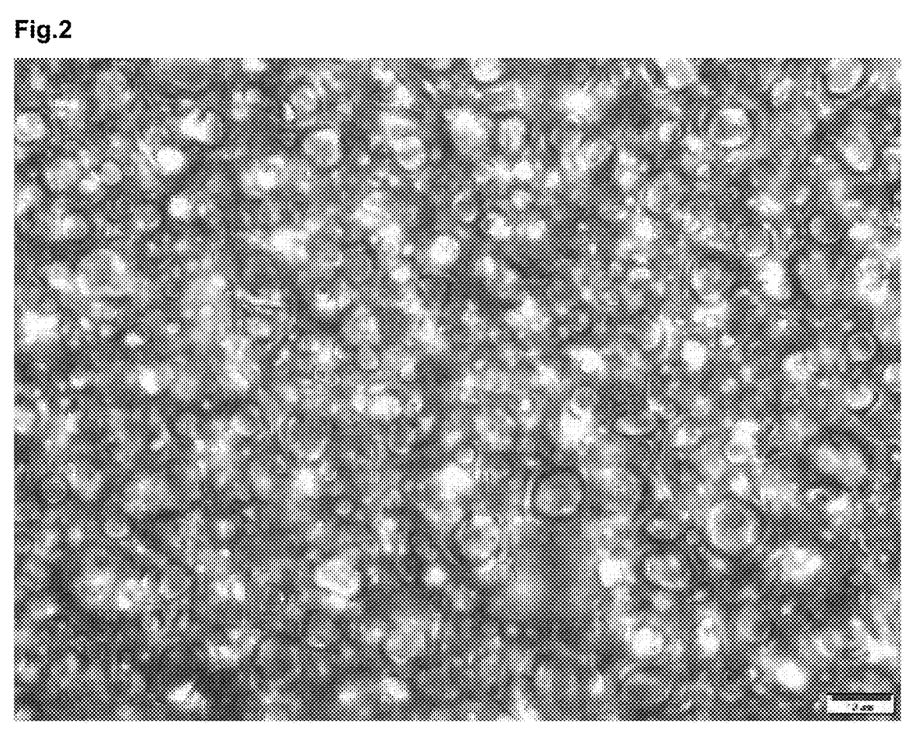
FIG. 2 is a microscopic image of Corn position 7.
Figure 3:
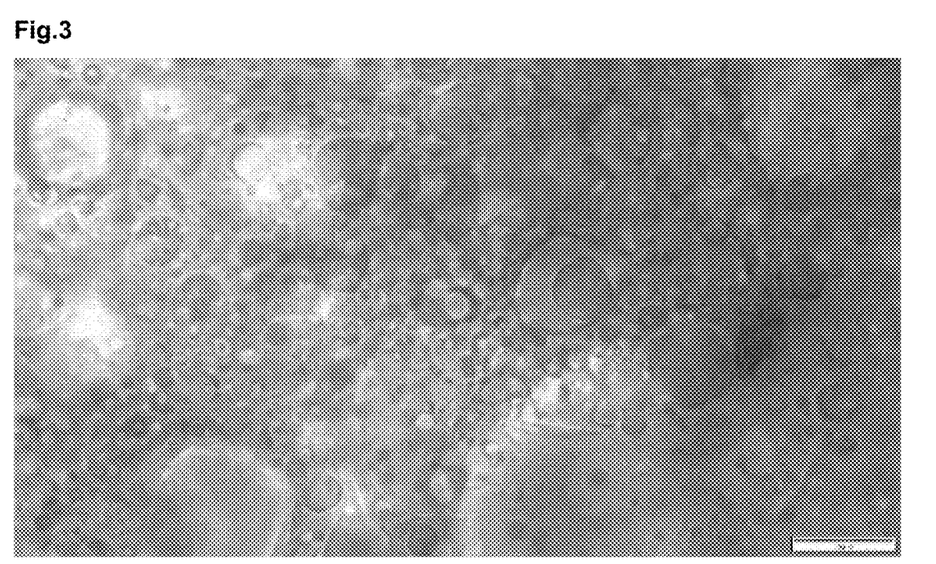
FIG. 3 is a microscopic image of Composition 8.

In addition, FIGS. 1 to 3 show micrographs of Compositions 3, 7, and 8 at room temperature (25° C.), respectively. Here, the micrographs were taken in a clean room at 25° C. by using OLYMPUS DP74, BX51 (with 100 magnification lens).

the fatty acid ester-based emulsifier from among the components constituting the O/W emulsion at a weight ratio in a range of about 1:5 to about 1:29 according to an embodiment, the W/O emulsion and the O/W emulsion were emulsified to form the W/O/W emulsion, and that the stable emulsion state was exhibited in Compositions 1 to 4 under various temperature conditions. In addition, it was confirmed that Compositions 1 to 4 according to an embodiment had very excellent feel of use and moisturizing feel.

However, in the case of Compositions 5 to 9 in which the thickener and the fatty acid ester-based emulsifier from among the components constituting the O/W emulsion were not included at a weight ratio in a range of about 1:5 to about 1:29 according to an embodiment, it was confirmed that the emulsion state in Compositions 5 to 9 were unstable and that both the feel of use and the moisturizing feel were degraded. In particular, referring to FIGS. 2 and 3, it was confirmed that agglomeration occurred frequently so that a stable emulsion formulation was not implemented.

That is, taking the above-described content into consideration, it was confirmed that, when preparing the W/O/W

TABLE 7

|  |  | Composition 1 | Composition 2 | Composition 3 | Composition 4 | Composition 5 | Composition 6 | Composition 7 | Composition 8 | Composition 9 |
|---|---|---|---|---|---|---|---|---|---|---|
| Emulsion stability | Low temperature (4° C.) | Stable | Stable | Stable | Stable | Unstable | Unstable | Unstable | Unstable | Unstable |
|  | Room temperature (25° C.) | Stable | Stable | Stable | Stable | Unstable | Unstable | Unstable | Unstable | Unstable |
|  | High temperature (45° C.) | Stable | Stable | Stable | Stable | Unstable | Unstable | Unstable | Unstable | Unstable |
|  | Cycles (−20° C. to 20° C.) | Stable | Stable | Stable | Stable | Unstable | Unstable | Unstable | Unstable | Unstable |
| Hardness |  | 450 | 400 | 300 | 250 | 800 | 850 | 900 | 50 | 50 |
| Feeling of use |  | 8 | 9 | 10 | 10 | 3 | 4 | 6 | 7 | 5 |
| Moisturizing feeling |  | 10 | 10 | 10 | 9 | 9 | 10 | 9 | 6 | 4 |

Referring to Table 7 and FIG. 1, it was confirmed that, when using Compositions 1 to 4 in which the thickener and emulsion cosmetic composition by emulsifying the W/O emulsion and the O/W emulsion and including the thickener and the fatty acid ester-based emulsifier at a weight ratio in a range of about 1:5 to about 1:29 in the O/W emulsion, the W/O/W emulsion cosmetic composition having excellent emulsification stability under various temperature conditions and excellent feel of use and moisturizing feel was provided.

Experimental Example 3: Evaluation of Cosmetic Composition Properties According to Mixing Ratio of O/W Emulsifier to Oil in O/W Emulsion (1) Preparation of O/W Emulsion An oil phase and a water phase disclosed in Table 8 [unit: wt %] were each heated to 80° C. Then, the oil phase was slowly added to the water phase, and the mixture was stirred for about 5 minutes at a HOMO speed of 3,500 rpm. Subsequently, the resulting mixture was cooled to about 60° C. at a PADDLE speed of 25 rpm, and finally, a thickener was added thereto and stirred for about 5 minutes at a HOMO speed of 3,500 rpm, thereby preparing an O/W emulsion.

TABLE 8

| Phase | Component | | Preparation Example 6 | Preparation Example 15 | Preparation Example 16 | Preparation Example 17 | Preparation Example 18 |
|---|---|---|---|---|---|---|---|
| Oil phase | O/W emulsifier | Fatty acid ester-based emulsifier | 9.57 | 9.57 | 9.57 | 9.57 | 9.57 |
| | | Fatty acid | 0.54 | 5.05 | 6.89 | — | 9.78 |
| | | Fatty alcohol | 3.26 | 5.43 | 7.61 | — | 10.73 |
| | | Wax | 1.63 | 1.63 | 1.63 | 1.63 | 1.63 |
| | | Oil | 26.74 | 20.06 | 16.04 | 30.54 | 10.03 |
| Water phase | Thickener | | 0.87 | 0.87 | 0.87 | 0.87 | 0.87 |
| | Polyol | | 27.17 | 27.17 | 27.17 | 27.17 | 27.17 |
| | Purified water | | | | to. 100 | | |

Cosmetic compositions were each prepared by changing amounts of the O/W emulsifier (total) and the oil as shown in Table 8 [unit: wt %] above while maintaining the total amount of these two components as 40.11 wt %. Also, the weight ratios of the O/W emulsifier to the oil used in Preparation Examples were also listed in Table 9 [unit: weight ratio].

TABLE 9

| | Preparation Example 6 | Preparation Example 15 | Preparation Example 16 | Preparation Example 17 | Preparation Example 18 |
|---|---|---|---|---|---|
| O/W emulsifier | 0.5 | 1 | 1.5 | 0.313 | 3 |
| Oil | 1 | 1 | 1 | 1 | 1 |

(2) Preparation of Cosmetic Composition

Afterwards, as disclosed in Table 10, the W/O emulsion of Preparation Example 2 was slowly added to each O/W emulsion, stirred for about 10 minutes at a HOMO speed of 3,500 rpm, and then cooled at a temperature of about 40° C. at a PADDLE speed of 25 rpm for defoamation, thereby preparing a W/O/W emulsion cosmetic composition.

Here, an amount of the O/W emulsion in the mixture was 700 parts by weight based on 100 parts by weight of the O/W emulsion, thereby forming the W/O/W emulsion cosmetic composition.

TABLE 10

| | Composition 1 | Composition 10 | Composition 11 | Composition 12 | Composition 13 |
|---|---|---|---|---|---|
| W/O emulsion | Preparation Example 2 | Preparation Example 2 | Preparation Example 2 | Preparation Example 2 | Preparation Example 2 |
| O/W emulsion | Preparation Example 6 | Preparation Example 15 | Preparation Example 16 | Preparation Example 17 | Preparation Example 18 |

(3) Evaluation of Performance of Cosmetic Composition

For the cosmetic compositions of Compositions 10 to 13, the performance evaluation test was carried out in the same manner as in Experimental Example 1, and the results are shown in Table 11. Here, since Composition 1 is the same as in Experimental Example 2, an additional experiment was not performed thereon, and the results in Table 7 for Composition 1 were used the same.

TABLE 11

|  |  | Composition 1 | Composition 10 | Composition 11 | Composition 12 | Composition 13 |
|---|---|---|---|---|---|---|
| Emulsion stability | Low temperature (4° C.) | Stable | Stable | Stable | Unstable | Unstable |
|  | Room temperature (25° C.) | Stable | Stable | Stable | Unstable | Unstable |
|  | High temperature (45° C.) | Stable | Stable | Stable | Unstable | Unstable |
|  | Cycles (−20° C. to 20° C.) | Stable | Stable | Stable | Unstable | Unstable |
| Hardness |  | 450 | 440 | 440 | 150 | 70 |
| Feeling of use |  | 8 | 10 | 10 | 8 | 6 |
| Moisturizing feeling |  | 10 | 10 | 9 | 8 | 7 |

Referring to Table 11. 1, it was confirmed that, when using Compositions 1, 10, and 11 in which the oil and the O/W emulsifier from among the components constituting the O/W emulsion at a weight ratio in a range of about 1:0.4 to about 1:2.5 according to an embodiment, the W/O emulsion and the O/W emulsion were emulsified to form the W/O/W emulsion, and that the stable emulsion state was exhibited in Compositions 1, 10, and 11 under various temperature conditions. In addition, it was confirmed that both the feel of use and the moisturizing feel were very excellent.

However, in the case of Compositions 12 and 13 in which the oil and the O/W emulsifier from among the components constituting the O/W emulsion were not included at a weight ratio in a range of about 1:0.4 to about 1:2.5 according to an embodiment, it was confirmed that the emulsion state in Compositions 12 and 13 were unstable and that both the feel of use and the moisturizing feel were degraded.

That is, taking the above-described content into consideration, it was confirmed that, when preparing the W/O/W emulsion cosmetic composition by emulsifying the W/O emulsion and the O/W emulsion and including the oil and the O/W emulsifier at a weight ratio in a range of about 1:0.4 to about 1:2.5 in the O/W emulsion, the W/O/W emulsion cosmetic composition having excellent emulsification stability under various temperature conditions and excellent feel of use and moisturizing feel was provided.

Experimental Example 4: Evaluation of Properties of Cosmetic Composition According to Mixing Amount of W/O Emulsion and O/W Emulsion (1) Preparation of Cosmetic Composition The W/O emulsion of Preparation Example 2 and the O/W emulsion of Preparation Example 6 were mixed and emulsified to prepare a cosmetic composition, but these two emulsions were mixed at a ratio shown in Table 12 [unit: parts by weight] to prepare a cosmetic composition.

TABLE 12

|  | Composition 14 | Composition 15 | Composition 16 | Composition 17 | Composition 18 | Composition 19 | Composition 20 | Composition 21 |
|---|---|---|---|---|---|---|---|---|
| W/O emulsion | 100 | 100 | 100 | 100 | 100 | 100 | 100 | 100 |
| O/W emulsion | 100 | 200 | 300 | 900 | 1,500 | 1,900 | 2,500 | 4,000 |

(2) Evaluation of Performance of Cosmetic Composition

For the cosmetic compositions of Compositions 14 to 21, the performance evaluation test was carried out in the same manner as in Experimental Example 1, and the results are shown in Table 13.

TABLE 13

|  |  | Composition 14 | Composition 15 | Composition 16 | Composition 17 |
|---|---|---|---|---|---|
| Emulsion stability | Low temperature (4° C.) | Unstable | Unstable | Stable | Stable |

TABLE 13-continued

|  | | | | | |
|---|---|---|---|---|---|
| | Room temperature (25° C.) | Unstable | Unstable | Stable | Stable |
| | High temperature (45° C.) | Unstable | Unstable | Stable | Stable |
| | Cycles (−20° C. to 20° C.) | Unstable | Unstable | Stable | Stable |
| Hardness | | 50 | 50 | 250 | 300 |
| Feeling of use | | 5 | 5 | 9 | 10 |
| Moisturizing feeling | | 10 | 10 | 10 | 9 |

| | | Composition 18 | Composition 19 | Composition 20 | Composition 21 |
|---|---|---|---|---|---|
| Emulsion stability | Low temperature (4° C.) | Stable | Stable | Stable | Stable |
| | Room temperature (25° C.) | Stable | Stable | Stable | Stable |
| | High temperature (45° C.) | Stable | Stable | Stable | Stable |
| | Cycles (−20° C. to 20° C.) | Stable | Stable | Stable | Stable |
| Hardness | | 350 | 350 | 400 | 400 |
| Feeling of use | | 10 | 9 | 8 | 7 |
| Moisturizing feeling | | 9 | 8 | 3 | 3 |

Referring to Table 13, it was confirmed that, when preparing a W/O/W emulsion cosmetic composition by mixing the O/W cosmetic composition in an amount in a range of about 300 parts by weight to about 2,400 parts by weight based on 100 parts by weight of the W/O cosmetic composition, excellent feel of use and moisturizing feel were implemented at the same time while implementing a stable emulsion state under various temperature conditions.

Experimental Example 5: Evaluation of Percutaneous Absorption Rate

Compositions 22 to 24 were prepared as shown below, and about 0.3 g of each composition was applied to the skin. Then, a percutaneous absorption rate of niacinamide was evaluated, and the results are shown in Tables 14 and 15.

Here, Table 14 shows quantitative measurement values of niacinamide permeation amount (ppm) according to time. In addition, based on these values, the total niacinamide permeation amount [total niacinamide permeation amount= TOTAL/0.3] and the permeability [permeability=total niacinamide permeation amount/200] were calculated, and the results are shown in Table 15.

Composition 22 (O/W emulsion): Composition 22 was prepared in the same manner as in Preparation Example 6 (O/W emulsion), except that the niacinamide was included in the water phase;

Composition 23 (W/O/W emulsion): Composition 23 was prepared in the same manner as in the preparation of Composition 16, except that niacinamide was included in the water phase of the W/O emulsion; and Composition 24 (W/O/W emulsion): Composition 24 was prepared in the same manner as in the preparation of Composition 16, except that niacinamide was included in the water phase of the O/W emulsion.

In Compositions 22 to 24, a total of 2 wt % of niacinamide was used based on the total composition amount.

TABLE 14

| | 1 H | 2 H | 4 H | 6 H | 8 H | 24 H | TOTAL |
|---|---|---|---|---|---|---|---|
| Composition 22 O/[W] | 2.22 | 11.2 | 19.6 | 23.67 | 31.57 | 124.22 | 212.48 |
| Composition 23 [W]/O/W | 2.31 | 10.21 | 22.6 | 33.51 | 35.45 | 160.94 | 265.02 |
| Composition 24 W/O/[W] | 4.92 | 16.27 | 32.72 | 42 | 43.95 | 239.48 | 379.34 |

TABLE 15

| | Penetration amount [PPM] | Penetration rate [%] |
|---|---|---|
| Composition 22 | 708.27 | 3.54 |
| Composition 23 | 883.40 | 4.42 |
| Composition 24 | 1264.47 | 6.32 |

Referring to Tables 14 and 15, it was confirmed that, compared to Composition 23 including the O/W emulsion, Compositions 23 and 24 including the W/O/W emulsion had a further excellent percutaneous absorption rate of niacinamide. Thus, when a cosmetic composition is formed in the form of the W/O/W emulsion, the absorption rate of active ingredients on the skin expected to be further improved.

In addition, among the W/O/W emulsions, compared to Composition 23 including niacinamide in the innermost water phase, Composition 24 including niacinamide in the outermost water phase was found to have a more excellent percutaneous absorption rate of niacinamide. Accordingly, it was confirmed that, when a cosmetic composition is formed in the form of an W/O/W emulsion under conditions that an active ingredient is included in the outermost water phase, the active ingredient was effectively absorbed into the skin.

As described above, the descriptions of the present disclosure are only for illustrating the present disclosure, and it will be apparent to a person having ordinary skill in the art to which the present disclosure pertains that the embodiments disclosed herein can be easily modified into other specific forms without changing the technical spirit or essential features. Therefore, it should be understood that Examples described herein are illustrative in all respects and are not limited. For example, each component described in a single type may be implemented in a dispersed form, and likewise, components described as being dispersed may be implemented in a combined form.

The scope of the present disclosure is indicated by the following claims rather than the detailed description above, and all changes or modifications derived from the meaning and scope of the claims and equivalent concepts should be interpreted as being included in the scope of the present disclosure.

The invention claimed is:

1. A water-in-oil-in-water (W/O/W) emulsion cosmetic composition comprising an oil-in-water emulsion and a water-in-oil emulsion, wherein
the water-in-oil emulsion comprises:
a W/O oil phase comprising a W/O emulsifier and wax; and a W/O water phase, and
the oil-in-water emulsion comprises:
an O/W oil phase comprising
an O/W emulsifier comprising one or more selected from the group consisting of a fatty acid ester-based emulsifier, a fatty acid, and fatty alcohol,
wax, and
oil; and
an O/W water phase comprising a thickener and a polyol;
wherein the oil-in-water emulsion comprises the thickener and the fatty acid ester-based emulsifier at a weight ratio in a range of about 1:5 to about 1:29.

2. The W/O/W emulsion cosmetic composition of claim 1, wherein the water-in-oil emulsion comprises the W/O emulsifier and the wax at a weight ratio in a range of about 1:0.3 to about 1:9.

3. The W/O/W emulsion cosmetic composition of claim 1, wherein the oil-in-water emulsion comprises the oil and the O/W emulsifier at a weight ratio in a range of about 1:0.4 to about 1:2.5.

4. The W/O/W emulsion cosmetic composition of claim 1, wherein the W/O/W emulsion cosmetic composition comprises the oil-in-water emulsion in an amount in a range of about 300 parts by weight to about 2,400 parts by weight based on 100 parts by weight of the water-in-oil emulsion.

5. The W/O/W emulsion cosmetic composition of claim 1, wherein the water-in-oil emulsion comprises the W/O emulsifier in an amount in a range of based on a total weight of the water-in-oil emulsion of about 0.01 wt % to about 10 wt % and the wax in an amount in a range of about 0.01 wt % to about 10 wt %, based on the total weight of the water-in-oil emulsion.

6. The W/O/W emulsion cosmetic composition of claim 1, wherein the oil-in-water emulsion comprises the O/W emulsifier in an amount in a range of about 0.1 wt % to about 28 wt %, the wax in an amount in a range of about 0.5 wt % to about 5 wt %, the oil in an amount in a range of about 0.5 wt % to about 40 wt %, the thickener in an amount in a range of about 0.1 wt % to about 3 wt %, and the polyol in an amount in a range of about 20 wt % to about 40 wt %, based on a total weight of the oil-in-water emulsion.

7. The W/O/W emulsion cosmetic composition of claim 1, further comprising an active ingredient, wherein the active ingredient is included in the O/W water phase.

8. A method of preparing a water-in-oil-in-water (W/O/W) emulsion cosmetic composition, the method comprising:
preparing a water-in-oil emulsion comprising: a W/O oil phase comprising a W/O emulsifier and wax; and a W/O water phase;
preparing an oil-in-water emulsion comprising: an O/W oil phase comprising an O/W emulsifier comprising one or more selected from the group consisting of a fatty acid ester-based emulsifier, a fatty acid, and fatty alcohol, wax, and oil; and an O/W water phase comprising a thickener and polyol,
wherein the oil-in-water emulsion comprises the thickener and the fatty acid ester-based emulsifier at a weight ratio in a range of about 1:5 to about 1:29; and
adding and stirring the water-in-oil emulsion in the oil-in-water emulsion to prepare a W/O/W emulsion cosmetic composition.

9. The W/O/W emulsion cosmetic composition of claim 1, wherein the W/O/W emulsion cosmetic composition is formed by emulsifying the oil-in-water emulsion and the water-in-oil emulsion.

10. The W/O/W emulsion cosmetic composition of claim 1, wherein the thickener is polyacrylate based.

11. The W/O/W emulsion cosmetic composition of claim 10, wherein the thickener is polyacrylate-13.

12. The W/O/W emulsion cosmetic composition of claim 1, wherein the polyol comprises glycerin, butylene glycol, 1,3-propanediol, methpropanediol, polyglycerin-3, or combinations thereof.

13. The W/O/W emulsion cosmetic composition of claim 1, wherein the polyol comprises 1,3-propanediol, methpropanediol, polyglycerin-3 or combinations thereof.

14. The W/O/W emulsion cosmetic composition of claim 1, further comprising an active ingredient, wherein the active ingredient comprises niacinamide, a *Broussonetia* extract, arbutin, ethyl ascorbyl ether, ascorbyl glucoside, magnesium ascorbyl phosphate, and ascorbyl tetraisopalmitate, or combinations thereof.

15. The W/O/W emulsion cosmetic composition of claim 4, wherein the W/O/W emulsion cosmetic composition comprises the oil-in-water emulsion in an amount in a range of about 700 parts by weight to about 2,400 based on 100 parts by weight of the water-in-oil emulsion.

16. The W/O/W emulsion cosmetic composition of claim 1, wherein the W/O emulsifier comprises cetyl PEG/PPG-10/1 dimethicone, sorbitan sesquioleate, polyglyceryl-4 diisostearate/polyhydroxystearate/sebacate, lauryl polyglyceryl-3 polydimethylsiloxyethyl dimethicone, or combinations thereof.

17. The W/O/W emulsion cosmetic composition of claim 1, wherein the water-in-oil emulsion comprises the wax.

18. The W/O/W emulsion cosmetic composition of claim 16, wherein the wax comprises behenate/eicosadioate, beeswax, Jojoba seed wax, microcrystalline wax, shea butter, ceresin wax, paraffin wax, polyethylene wax, ozokerite, petrolatum, candelilla wax, or combinations thereof.

19. The W/O/W emulsion cosmetic composition of claim 17, wherein the wax comprises beeswax wax or candelilla wax.

* * * * *